United States Patent
Doke et al.

(10) Patent No.: US 7,720,567 B2
(45) Date of Patent: May 18, 2010

(54) AUTOMATED BOX OPENING APPARATUS

(75) Inventors: Michael J Doke, Prosper, TX (US); Jay Dugat, Spring, TX (US)

(73) Assignees: Cornerstone Automation Systems, Inc., Prosper, TX (US); Robotica, Inc., Spring, TX (US)

( * ) Notice: Subject to any disclaimer, the term of this patent is extended or adjusted under 35 U.S.C. 154(b) by 602 days.

(21) Appl. No.: 11/164,909

(22) Filed: Dec. 9, 2005

(65) Prior Publication Data

US 2007/0162174 A1 Jul. 12, 2007

(51) Int. Cl.
*G06F 7/00* (2006.01)
(52) U.S. Cl. .................................... 700/230
(58) Field of Classification Search ............. 700/97.98, 700/116, 117, 170, 230, 253, 303, 97, 98; 83/76.6, 76.7, 76.8
See application file for complete search history.

(56) References Cited

U.S. PATENT DOCUMENTS

| | | | |
|---|---|---|---|
| 3,485,339 A | 12/1969 | Miller et al. | |
| 3,668,821 A | 6/1972 | Benson et al. | |
| 3,757,973 A | 9/1973 | Lambert et al. | |
| 3,922,778 A | 12/1975 | Aalpoel | |
| 3,937,342 A | 2/1976 | Ittner et al. | |
| 4,290,617 A | 9/1981 | Yoshida | |
| 4,291,518 A | 9/1981 | Johnson | |
| 4,514,963 A | 5/1985 | Bruno | |
| 4,610,596 A | 9/1986 | Bouldin et al. | |
| 4,835,836 A | 6/1989 | Van Uitert | |
| 5,011,467 A | 4/1991 | Traegaardh | |
| 5,028,181 A | 7/1991 | Jenkins et al. | |
| 5,031,498 A | 7/1991 | Koppel | |
| 5,048,267 A | 9/1991 | Kudo et al. | |
| 5,059,082 A | 10/1991 | Tanttu et al. | |

(Continued)

FOREIGN PATENT DOCUMENTS

DE 19724040 A1 8/1998

(Continued)

OTHER PUBLICATIONS

U.S. Appl. No. 60/741,414; Higendorf; "Case Cutter Appartus and Method"; Dec. 1, 2005.*

(Continued)

*Primary Examiner*—Albert DeCady
*Assistant Examiner*—Chad Rapp
(74) *Attorney, Agent, or Firm*—Wong, Cabello, Lutsch, Rutherford & Brucculeri LLP (57) ABSTRACT

An apparatus includes a conveyor, a programmable motion device, and a controller. The conveyor preferably includes actuatable rollers, and the programmable motion device is preferably a robotic arm. The controller operates the conveyor, a stopping rail, and a positioning rail to move and position a box in a cutting position relative to the robotic arm. The controller determines three dimension of the box and translates a programmed cut pattern to those determined dimensions. Based on the determined dimensions, the controller then operates the robotic arm to perform the programmed cut pattern in the box with the cutting element. The cutting element preferably has square blade so that each of the four blades can be used to cut a side of the box without having to rotate the cutting element during operation.

45 Claims, 9 Drawing Sheets

U.S. PATENT DOCUMENTS

| | | |
|---|---|---|
| 5,101,703 A | 4/1992 | Tanaka et al. |
| 5,144,789 A | 9/1992 | Focke et al. |
| 5,360,161 A | 11/1994 | Schaller et al. |
| 5,454,683 A | 10/1995 | Marom et al. |
| 5,649,801 A | 7/1997 | White |
| 5,862,907 A | 1/1999 | Taylor |
| 5,931,071 A | 8/1999 | Mori |
| 6,189,298 B1 | 2/2001 | Kuji et al. |
| 6,302,408 B1 | 10/2001 | Zierpka |
| 6,325,393 B1 | 12/2001 | Chen et al. |
| 6,457,916 B2 | 10/2002 | Wienhold |
| 6,629,593 B2 | 10/2003 | Zeitler |
| 6,694,852 B1 | 2/2004 | Ours et al. |
| 6,725,631 B2 | 4/2004 | Skrak et al. |
| 6,725,752 B1 | 4/2004 | Torrazza |
| 6,863,486 B2 | 3/2005 | Ours et al. |
| 6,982,731 B2 * | 1/2006 | Hall et al. .................... 345/689 |
| 7,174,695 B2 | 2/2007 | Porter et al. |
| 7,182,007 B2 * | 2/2007 | Berge et al. ..................... 83/13 |
| 2001/0001516 A1 * | 5/2001 | Hardgrove et al. .......... 264/400 |
| 2001/0003939 A1 * | 6/2001 | Liu et al. ...................... 83/800 |
| 2002/0134209 A1 | 9/2002 | Burman et al. |
| 2002/0162302 A1 | 11/2002 | Thomson et al. |
| 2003/0150695 A1 | 8/2003 | Cotter et al. |
| 2004/0194428 A1 | 10/2004 | Close et al. |
| 2004/0250670 A1 | 12/2004 | Porter et al. |
| 2006/0074525 A1 * | 4/2006 | Close et al. .................. 700/245 |
| 2006/0206233 A1 * | 9/2006 | Carpenter et al. ........... 700/159 |
| 2006/0260451 A1 * | 11/2006 | Capodieci ....................... 83/34 |
| 2007/0025512 A1 * | 2/2007 | Gertsenshteyn et al. ........ 378/86 |
| 2007/0125209 A1 * | 6/2007 | Hilgendorf ...................... 83/76 |
| 2007/0125211 A1 * | 6/2007 | Hilgendorf .................... 83/213 |
| 2007/0125212 A1 * | 6/2007 | Hilgendorf .................... 83/408 |
| 2007/0163099 A1 * | 7/2007 | Townsend et al. ......... 29/402.01 |

FOREIGN PATENT DOCUMENTS

| | | |
|---|---|---|
| DE | 20314281 U1 | 5/2004 |
| EP | 0845440 A | 6/1998 |
| EP | 1329388 A | 7/2003 |
| GB | 2249516 A | 5/1992 |
| JP | 2000343486 A | 12/2000 |
| JP | 2002002636 A | 1/2002 |
| WO | WO 2006/025868 A1 | 3/2006 |

OTHER PUBLICATIONS

U.S. Appl. No. 10/812,386; Herman et al. "Mail Screening Apparatus" Mar. 30, 2004.*

Cornerstone Automation Systems, "ZoneMaster(™) 24 Volt Accumulation Conveyor Brochure," undated, obtained from URL:http://www.cornerstoneautosys.com, 2-pages.

Cornerstone Automation Systems, "SortMaster(™) 24 Volt Bi-Directional Divert Brochure," undated, obtained from URL:http://www.cornerstoneautosys.com, 1-page.

Cornerstone Automation Systems, "CASI 150 In-Line Barcode Label Verifier Brochure," undated, obtained from URL:http://www.cornerstoneautosys.com, 2-pages.

Cornerstone Automation Systems, "SolidLabel(™) Brochure," undated, obtained from URL:http://www.cornerstoneautosys.com, 2-pages.

Cornerstone Automation Systems, "Solid Count(™) Brochure," undated, obtained from URL:http://www.cornerstoneautosys.com, 3-pages.

Cornerstone Automation Systems, "SolidShip(™) Brochure," undated, obtained from URL:http://www.cornerstoneautosys.com, 3-pages.

Non-Final Rejection dated Nov. 5, 2007, in U.S. Appl. No. 11/400,985 (Pub No. 2007/0125209).

Non-Final Rejection dated Jan. 24, 2008 in U.S. Appl. No. 11/400,995 (Pub No. 2007/0125211).

PCT International Search Report received in corresponding application No. PCT/US06/61729 dated Dec. 31, 2008.

HMC Products, Inc.,"Case Cutter: A breakthrough in case top removal and tray cutting," obtained from URL:http://www.casecutter.com/main.html, generated on Oct. 28, 2005, 1-page.

HMC Products, Inc.,"Case cutter boosts productivity at distribution center," obtained from URL:http://www.casecutter.com/testimonial.html, generated on Oct. 28, 2005, 2-pages.

HMC Products, Inc., "Cost Justification Study," obtained from URL:http://www.casecutter.com/coststudy.html, generated on Oct. 28, 2005, 2-pages.

HMC Products, Inc., "Case cutter," obtained from URL:http://www.casecutter.com/design.html, generated on Dec. 22, 2005, 1-page.

Cornerstone Automation Systems, "CASI 950 Conveyor Scale Brochure," undated, obtained from URL:http://www.cornerstoneautosys.com, 2-pages.

Cornerstone Automation Systems, "CASI 961 In-Motion Checkweigher Brochure," undated, obtained from URL:http://www.cornerstoneautosys.com, 2-pages.

Cornerstone Automation Systems, "CASI 2000 Mobile In-Motion Checkweigher Brochure," undated, obtained from URL:http://www.cornerstoneautosys.com, 3-pages.

Cornerstone Automation Systems, "Model 1050 SolidSuite(™) Control Console Brochure," undated, obtained from URL:http://www.cornerstoneautosys.com, 2-pages.

Cornerstone Automation Systems, "CASI 1110 Light Industrial Computer Brochure," undated, obtained from URL:http://www.cornerstoneautosys.com, 2-pages.

Cornerstone Automation Systems, "SolideCube(™) 4000 Carton Dimensioning System Brochure," undated, obtained from URL:http://www.cornerstoneautosys.com, 2-pages.

Supplementary European Search Report in counterpart application No. EP 06 84 6513, dated Jan. 12, 2010, 11-pgs.

Electronic Translation of EP1329388 obtained from the EPO, generated on Feb. 16, 2010.

English Abstract of JP2000343486.

Electronic Translation of DE19724040 obtained from the EPO, generated on Feb. 16, 2010.

Electronic Translation of DE20314281 obtained from the EPO, generated on Feb. 16, 2010.

English Abstract of JP2002002636.

* cited by examiner

AUTOMATED BOX OPENING APPARATUS

FIELD OF THE DISCLOSURE

The subject matter of the present disclosure relates to an apparatus for automatically cutting or opening boxes or other containers.

BACKGROUND OF THE DISCLOSURE

Many industries handle boxes, cartons, or other types of containers during operation. For example, co-pack operations, retailers, distributors, and various other facilities handle boxes during operation. These facilities use various handling systems, such as conveyor systems, bar code readers, radio frequency tag scanners, labeling systems, and weighing stations, to sort, track, and inventory the boxes and their contents during operation. In addition, these facilities may open or cut the boxes during handling. The boxes can have various sizes and may require various types of cuts. In addition, the boxes can be sealed or closed with various materials. Manually opening or cutting such boxes is not very efficient and is unsafe. What is needed is an automated way to open or cut boxes that can be incorporated into the existing handling systems used by such facilities.

SUMMARY OF THE DISCLOSURE

In one embodiment of the present disclosure, a box processing apparatus includes a conveyor, a programmable motion device, and a controller. The conveyor preferably includes actuatable rollers and defines at least two separately operable zones. The programmable motion device is preferably a robotic arm capable of moving a cutting element in at least three substantially orthogonal axes. The controller operates the conveyor to move a box to a cutting position relative to the robotic arm, and the controller actuates a stopping rail to stop the box in the cutting position on the conveyor. Once the box is stopped, the controller actuates a positioning rail to hold the box in the cutting position against a rail of the conveyor.

Then, the controller determines three dimension of the box and translates a programmed cut pattern to those determined dimensions. For example, the controller uses a linear displacement transducer coupled to the positioning rail to determine a width of the box. The controller also uses a first laser sensor directed orthogonal to the conveyor to determine the height of the box and uses a second laser directed parallel to the conveyor to determine a length of the box. Based on the determined dimensions, the controller operates the robotic arm to perform the programmed cut pattern in the box with the cutting element.

In another embodiment of the present disclosure, a box cutting head includes a first portion coupleable to a device capable of moving the head. A second portion of the head couples to the first portion and holds a blade therebetween. The blade has a plurality of cutting surfaces that extend beyond the head. In one example, the blade has four edges extending beyond the head, and the four edges are substantially symmetrically positioned on four corners of a square. These four edges can provide up to eight cutting surfaces. During use, a first of the cutting surfaces produces a first cut in a first side of a box when the device translates the head in a first direction, and a second of the cutting surfaces produces a second cut in a second side of the box when the device translates the head in a second direction. In addition, the head is rotatable about a central axis. When rotated relative to a side of the box, the orientation of the head determines a depth of the cut made by the blade in the side of the box while the device translates the head in a direction substantially parallel to the side.

Four of the eight cutting surfaces can be used to cut around the periphery of a box while moving the cutting head in the same direction around the box. The four additional cutting surfaces can also be used and can extend the overall life of a single blade. For example, these four additional cutting surfaces can be used by reversing the cutting direction of the head around the box or by flipping the orientation of the blade in the head.

In another embodiment of the present disclosure, a box cutting head has one or more blades with the capability to pivot on the head. During use, changes in the up and down position as the blade is moved along a box causes the blade to change angle and allows the blade to cut in more then a single axis at a time. Preferably, this embodiment of the cutting head includes more then one cutting blade so that the head includes the same benefits of the multiple cutting surfaces described above.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Figure 1A:
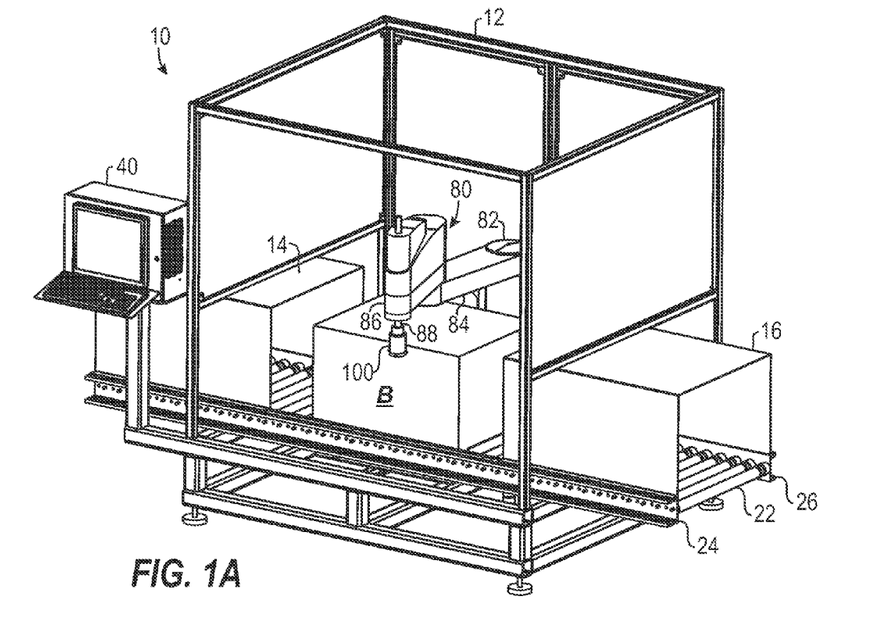
FIG. 1A illustrates a perspective view of an embodiment of an automated box opening apparatus according to certain teachings of the present disclosure.
Figure 1B:
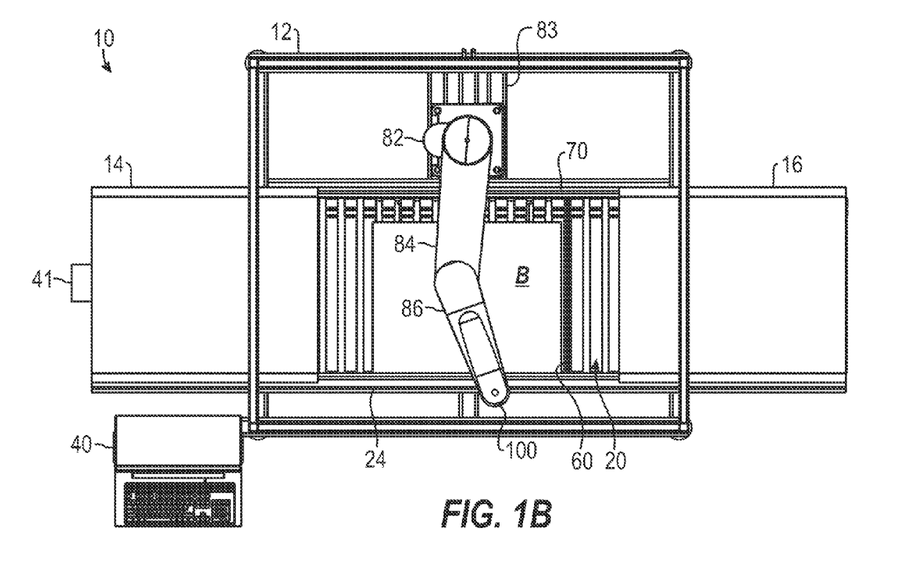
FIG. 1B illustrates a plan view of the automated box opening apparatus of FIG. 1A.

Referring to FIGS. 1A and 1B, an embodiment of an automated box opening apparatus 10 according to certain teachings of the present disclosure is illustrated in a perspective view and plan view, respectively. The apparatus 10 can be used for processing returned items, for automatically opening boxes of replenishment stock in order picking operations and points of sale, or for other operations handling boxes. The apparatus 10 includes a frame 12, a conveyor system 20, a controller 40, and a programmable motion device 80. The frame 12 supports the conveyor system 20, the controller 40, and the programmable motion device 80. The frame 12 can be formed from a structure of metal and can have various panels and shields, such as entry shield 14 and exit shield 16.

The conveyor system 20 has a plurality of rollers 22 connected between side rails 24 and 26, although other types of conveyor systems know in the art can be used. Preferably, the rollers 22 are self-automated, and their operation is separated into independently operable zones, as will be described in more detail below. In one embodiment, the conveyor system 20 is a 24-volt, zero pressure accumulation conveyor, such as available from Cornerstone Automation Systems.

The controller 40 controls the operation of the apparatus 10 by controlling the operation of the conveyor system 20, the programmable motion device 80, and other components described in more detail below. The controller 40 can be a computer, a laptop, or a less integrated system known in the art for controlling operation of the apparatus 10. In the present embodiment, the controller 40 is preferably an industrial computer, such as the CASI 1100 Light Industrial Computer, which is available from Cornerstone Automation Systems. The controller 40 preferably includes a processor, RAM, a hard drive, a monitor, keyboard, mouse, speakers, and a conventional operation system, such as Windows® XP.

The programmable motion device 80 can be a commercially available robot, a Computerized Numerical Control (CNC) machine, or a custom-built device. In the present embodiment, the programmable motion device 80 is a Selective Compliance Assembly Robot Arm (SCARA). As best shown in FIG. 1B, the robot 80 has a body 82 positioned on a base 83 attached to the frame 12. The robot 80 also has a jointed arm with first and second sections 84 and 86. As best shown in FIG. 1A, a cutting head 100 with one or more blades is coupled to a distal end of a shaft 88.

During operation, the robot 80 can move the cutting head 100 relative to a box B to perform programmed cuts, slits, scores, or perforations. In one embodiment, the robot 80 is capable of translating the cutting head in at least three substantially orthogonal axes. For example, a first axis runs parallel to the plane of the conveyor 20, while a second axis runs perpendicular to the first axis and parallel to the plane of the conveyor 20. The shaft 88 can be extended or retracted on the end of the arm section 86 to move the head 100 along a third axis orthogonal to the plane of the conveyor 20. In addition, the shaft 88 can preferably be rotated or turned to change the orientation of the blade on the cutting head 100 relative to the box B.

As best shown in FIG. 1B, a stopping rail 60 is positioned between rollers 22 of the conveyor system 20. This stopping rail 60 can be raised and lowered by an actuator (not shown), such as a solenoid or hydraulic cylinder, controlled by the controller 40. A positioning rail 70 is positioned substantially orthogonal to the stopping rail 60. This positioning rail 70 is moveable over the rollers 22 of the conveyor system 20 by an actuator (not shown), such as a solenoid or hydraulic cylinder, controlled by the controller 40.

During operation, the conveyor 20 moves a box into the apparatus 10 to a cutting position relative to the robot 80. The controller 40 actuates the stopping rail 60 to stop movement of the box in the direction of the conveyor 20. The controller 40 actuates the positioning rail 70, which moves the box against the rail 22 of the conveyor 20. Thus, the box is held in the cutting position relative to the robot 80. The controller 80 then programmably operates the robot 80, which moves the cutting head 100 relative to the box and performs a programmed cut pattern in the box.

In one embodiment, boxes entering the apparatus 10 may have the same dimensions as one another, and the controller 40 controls the programmable robot 80 to perform substantially the same cut pattern for each of the similar boxes. In this technique, the controller 40 has known dimensions of the boxes stored in memory so that the controller 40 is capable of programmably operating the robot 80 to perform the cut pattern of the box based on the known dimensions of the boxes in the apparatus 10.

In another embodiment, boxes entering the apparatus 10 may have different dimensions, but those dimensions may already be known by the controller 40 and stored in memory. The apparatus 10 can include an ID detection system 41, such as a barcode scanner, Radio Frequency (RF) tag scanner, or a vision pattern recognition system known in the art and available from Cornerstone Automation Systems. The detection system 41 can be mounted on the apparatus 10, as shown in FIG. 1B, or can be positioned elsewhere along a conveyor system (not shown) delivering boxes to the apparatus 10. The detection system 41 reads or detects the ID of the boxes entering the apparatus 10. Based on the IDs, the controller 40 determines from its memory the dimensions and the cut patterns associated with IDs for each box entering the apparatus 10. Then, the controller 40 controls the programmable robot 80 to perform the programmed cut patterns for each particular box entering the apparatus 10.

In yet another embodiment discussed in detail below, boxes entering the apparatus 10 can have different and unknown dimensions, and the apparatus 10 is capable of determining the dimensions of each box entering the apparatus 10 using various sensors. The controller 40 then uses the determined dimensions to operate the robot 80 programmably to perform the programmable cut patterns based on those determined dimensions. In this technique, the sensors (discussed below) and the controller 40 are used to measure the dimensions of the boxes and are capable of determining one or more dimensions of the boxes in the apparatus 10.

Figure 2A:
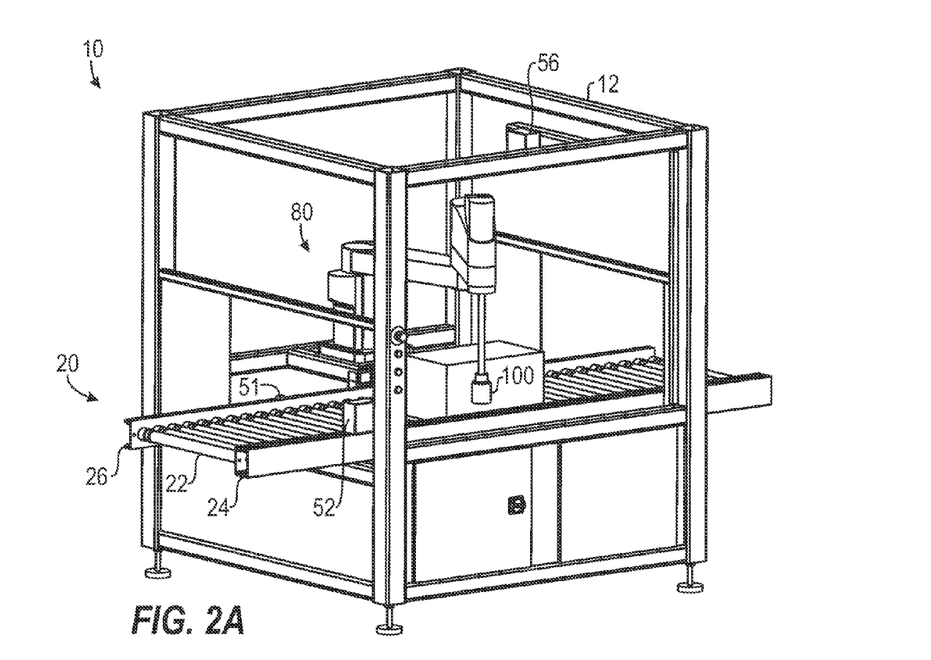
FIG. 2A illustrates a perspective view of another embodiment of an automated box opening apparatus according to certain teachings of the present disclosure.
Figure 2B:
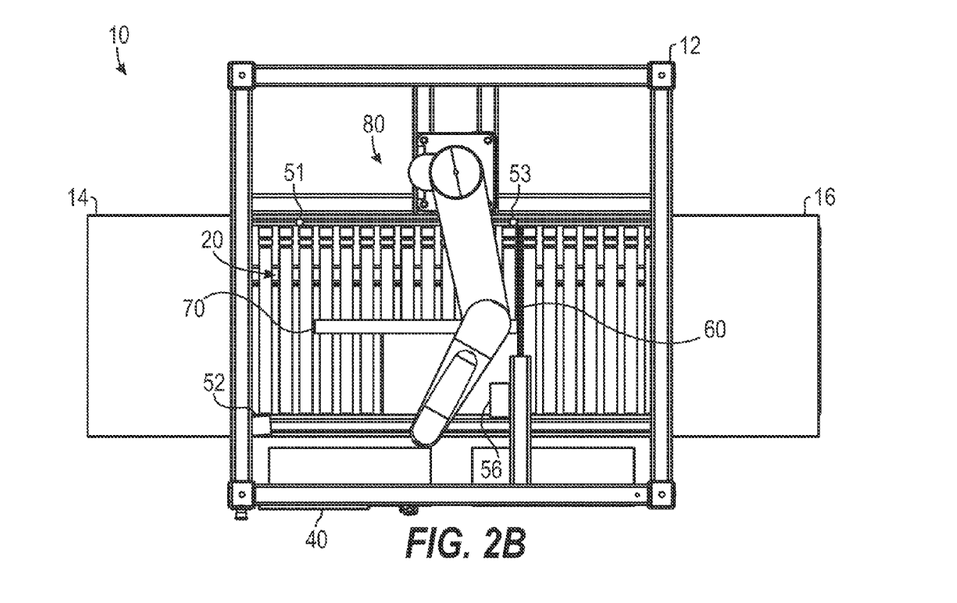
FIG. 2B illustrates a plan view of the automated box opening apparatus of FIG. 2A.
Figure 2C:
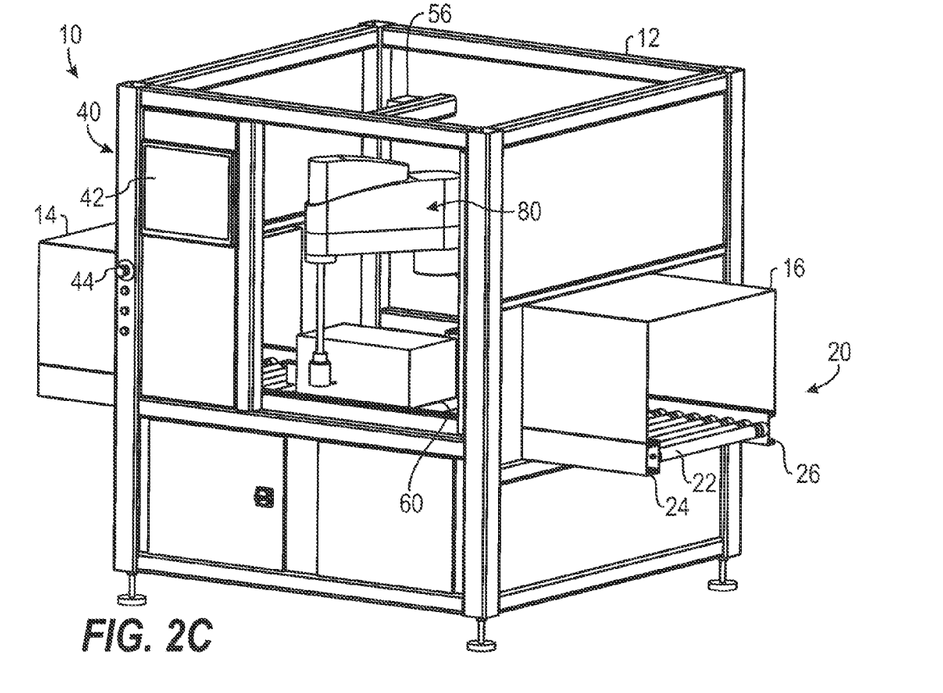
FIG. 2C illustrates another perspective view of the automated box opening apparatus of FIG. 2A.

Referring to FIGS. 2A, 2B, and 2C, another embodiment of the automated box opening apparatus 10 is illustrated in a first perspective view, a plan view, and a second perspective view, respectively. In FIGS. 2A-2C, the apparatus 10 has components that are substantially similar to those disclosed above with reference to the embodiment of FIGS. 1A-1B so that like reference numbers are used for like components between embodiments. In addition, some components are not shown in the various views of FIGS. 2A-2C for illustrative purposes.

As with the previous embodiment, the apparatus 10 of FIGS. 2A-2C includes frame 12, conveyor system 20, controller 40, stopping rail 60, positioning rail 70, and programmable motion device or robot 80. Each of these components is substantially similar to the previous embodiment discussed above. In the present embodiment, the controller 40 has a flat panel display 42 and stock controls 44. The central processing unit can be stored elsewhere on the apparatus 10, such as under the conveyor 20.

In the present embodiment, the apparatus 10 includes various sensors to determine measurements of the box being processed. As best shown in FIG. 2B, the apparatus 10 includes first and second photo eyes 51 and 53 mounted on a rail 26 of the conveyor 20. The first photo eye 51 is used to determine when a box enters the cutting zone on the conveyor system 20, while the second photo eye 53 is used to determine when a box leaves the cutting zone on the conveyor system 20. A suitable device for the photo eyes 51 and 53 is a World Beam QS18 Series Photoelectric sensor by Banner Engineering.

As best shown in FIGS. 2A-2B, a first laser sensor 52 is mounted on a rail 24 of the conveyor 20 and is used to determine a first dimension (e.g., length) of a box in the cutting position on the conveyor 20. In particular, this first laser sensor 52 uses a laser to measure a first distance from the sensor 52 to the back end of the box when in the cutting position, and the length of the box is determined by subtracting this first distance from a second distance extending from the first sensor 52 to the stopping rail 60.

A second laser sensor 56 is mounted above the conveyor 20 and is used to determine a second dimension (e.g., height) of the box in the cutting position on the conveyor 20. In particular, this second laser sensor 56 uses a laser to measure a third distance from the sensor 56 to the top of the box, and the height of the box is determined by subtracting this third distance from a fourth distance extending from the sensor 56 to the top of the conveyor 20. A suitable device for the laser sensors 52 and 56 is LT3 Model Laser displacement sensor by Banner Engineering.

A third sensor is used to determine a third (e.g., width) of the box when in the cutting position. In one embodiment, the third sensor can be another laser sensor directed at the side of the box adjacent the positioning rail 70. In the present embodiment, the positioning rail 70, which is best shown in FIG. 2B, includes a linear displacement transducer (LVDT) (not shown) coupled to the positioning rail 70. The linear displacement transducer is used to determine the width of the box when the rail 70 is moved against the side of the box to square the opposite side against the rail 24 of the conveyor 20. The box dimensions can also be obtained using a vision pattern recognition system, which measures the size of the box based on a calibrated field of view of a camera. A single camera with an isometric view of the box's position can be used to determine the box's size. Alternatively, multiple cameras with views of the box from different axes can be used to determine the box size.

During operation, the controller 40 determines the dimension of the box from the measurements of the laser sensors 52 and 56 and linear displacement transducer and derives the height, width, and length of each box conveyed to the cutting position. Using software, the controller 40 transforms a prescribed or programmed cut pattern to the dimensions of the box and converts the data into coordinate offsets. The coordinate offsets are sent to the programmable robot 80. Using the coordinate offsets, the programmable robot 80 mathematically creates a motion path for the cutting head 100 to perform the cut pattern in the box. Thus, it is possible to have a unique cut pattern for every box processed with the apparatus 10 based on a stored cut pattern and determined dimensions.

Figure 3A:
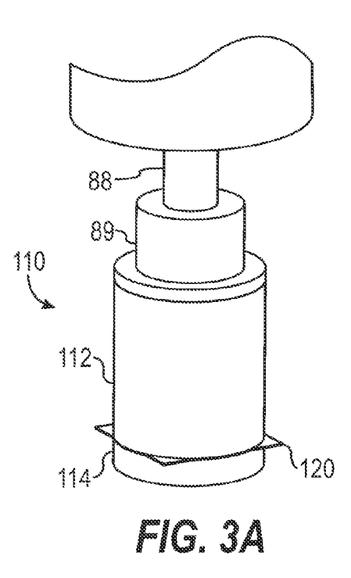
FIG. 3A illustrates an embodiment of a cutting head and blade for the automated box opening apparatus.

Before continuing discussion of the operation of the apparatus 10, reference is now made to embodiments of the cutting head 100 moveable by the programmable robot 80. Referring to FIG. 3A, one embodiment of a cutting head 110 for the apparatus is illustrated. The cutting head 110 includes first and second portions 112 and 114 that couple together to hold a blade 120 therebetween. The first portion 112 attaches to the shaft 88 of the robot (not shown) by a coupling member 89, which can be a conventional coupling member known in the art.

Figure 3B:
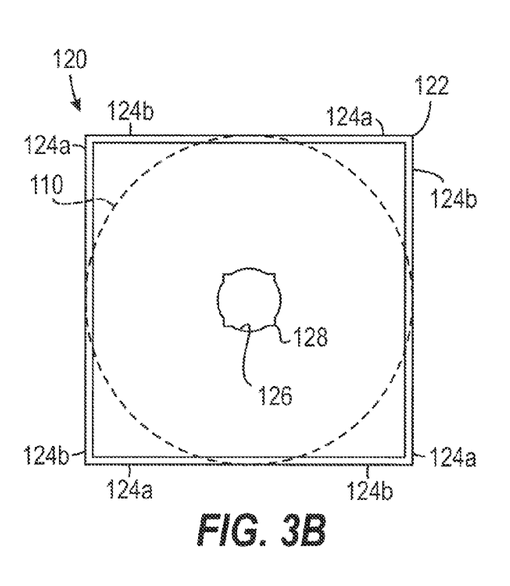
FIG. 3B illustrates a plan view of the blade for the cutting head of FIG. 3A.

As best shown in a plan view of FIG. 3B, the blade 120 is preferably symmetrical with a plurality of cutting edges 122. In the present embodiment, for example, the blade 120 in the present embodiment is square with four cutting edges 122, which can provide up to eight cutting surfaces 124. The blade 120 has a center arbor hole 126 so that blade 120 can be held in place when clamped between the first and second portions 112 and 114 of the head 110. The arbor hole 126 further defines locating indentations 128, which in the present example are four pointed features concentrically superimposed on the arbor hole 126. These indentions 128 can be used to locate the edges 122 of the blade 120 in the head 110 with respect to the rotational axis.

Thus, the blade 120 forms four, double-surfaced cutting edges 122 for a total of eight cutting surfaces 124a-b when mounted in the head 110. In addition, the blade 120 with its center arbor hole 126 can be self-centering and can ensure that the four edges 122 are concentrically located about the head 110. The arbor hole 126 is also beneficial for performing automated operation of changing blades performed by the robot during use. Four cutting surfaces 124a of the blade 120 can be used to cut around the periphery of a box when the head 110 is moved in the same direction. The four additional cutting surfaces 124b can also be used and can extend the overall life of a single blade 120. For example, these four additional cutting surfaces 124b can be used by reversing the cutting direction of the head 110 around a box or by flipping the orientation of the blade 120 in the head 110.

Figure 4A:
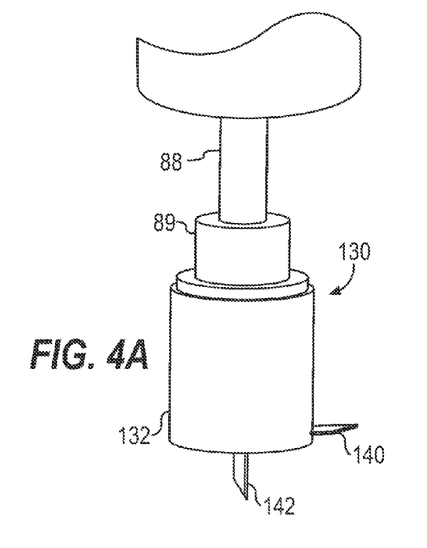
FIGS. 4A-4B illustrate other embodiments of a cutting head for the automated box opening apparatus.

Referring to FIG. 4A, another embodiment of a cutting head 130 for the apparatus is illustrated. In this embodiment, the head 130 has a body 132 that attaches to the shaft 88 of the robot (not shown) by a coupling member 89, which can be a conventional coupling member known in the art. A blade 140 with one or more cutting surface is mounted in the body 132. This blade 140 can be similar to type of blades commonly used in a box cutter hand tool. Moreover, the cutting head 130 can include a blade 142 extending vertically from the body 132. This vertical blade 142 can be used to cut along a top surface of a box.

Figure 4B:
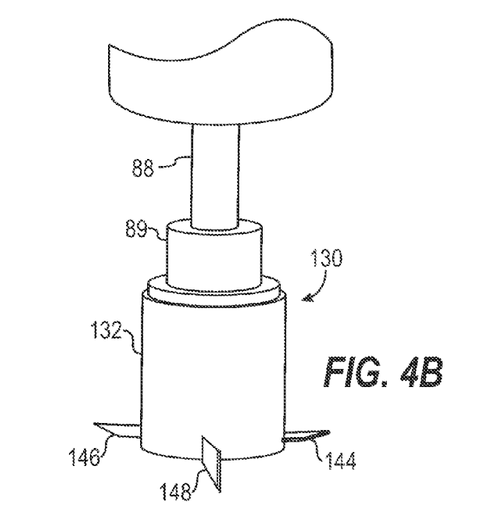

As shown in the embodiment of FIG. 4B, the cutting head 130 can include a plurality of blades 144, 146, and 148 mounted around the body 132 of the head 132. One of the blades 144 can be positioned substantially orthogonal to the axis of the shaft 88 and body 132, as shown in FIG. 4B. In addition, one or more of the other blades 146 and 148 can be positioned at an angle relative to the axis of the shaft 88 and body 132, depending on the types of cut patterns to be produced.

Figures 5A, 5B:
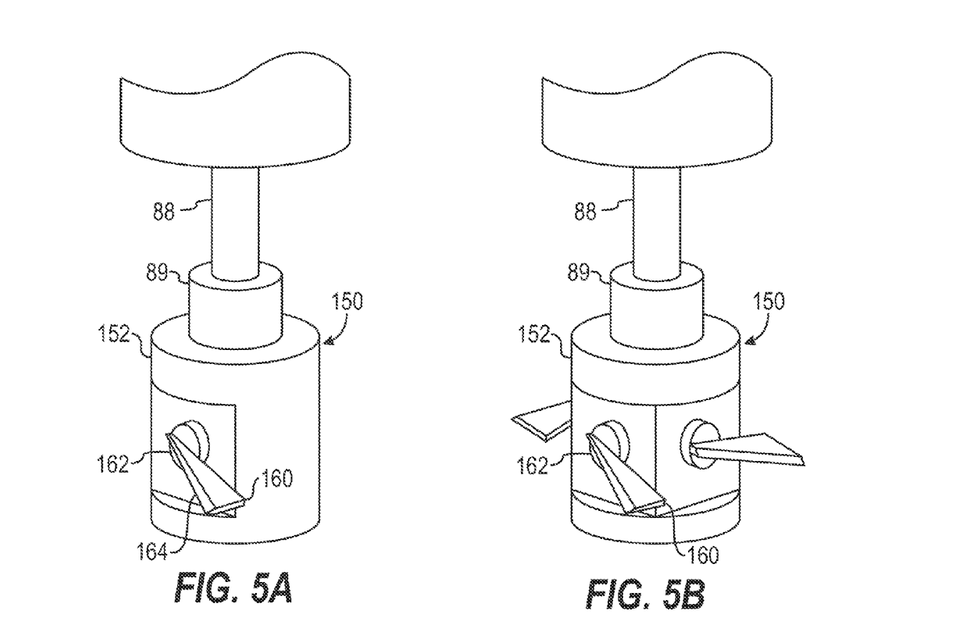
FIGS. 5A-5B illustrate additional embodiments of a cutting head having one or more pivotable blades for the automated box opening apparatus.

Referring to FIGS. 5A-5B, yet another embodiment of a cutting head 150 is illustrated. A body 152 of the head 150 has one or more blades 160 attached by pivot mechanisms 162 so that the blades 160 are pivotable on the body 152. When one of the blades 160 is cutting a side of the box, the blade 160 is adapted to pivot on the pivot mechanism 162 substantially in a direction the body is moved. Preferably, the blades 160 define angled cutting surfaces 164. Being pivotable, the blade 160 can produce straight and slanted/angled cuts in a sidewall of a box. The amount of pivot available to the blades 160 may be limited if desired. In addition, the pivot mechanisms 162 for the blades 160 may be designed to hold their angular position unless positively forced to pivot.

Figure 6:
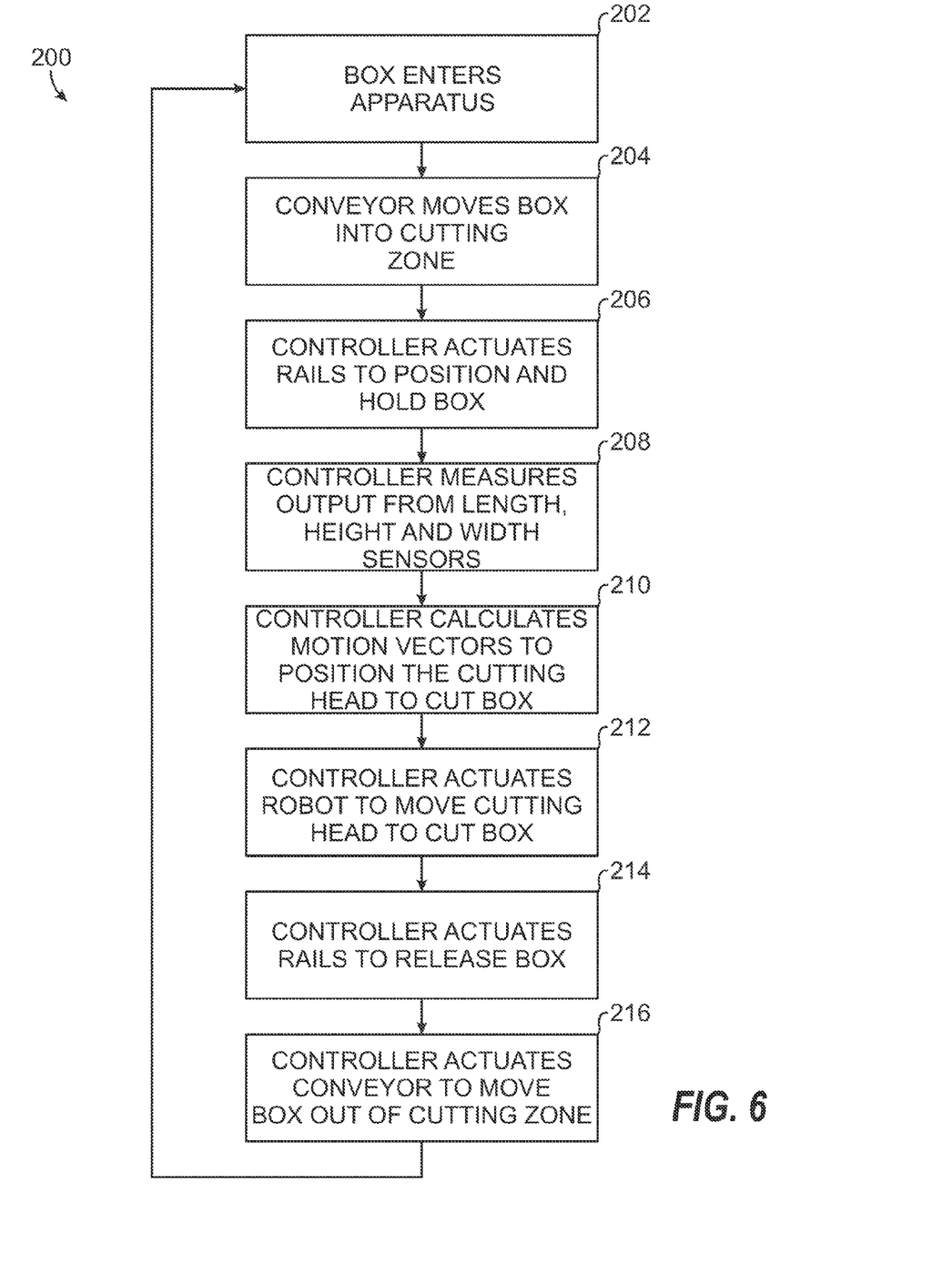
FIG. 6 illustrates an embodiment of a process for operating the automated box opening apparatus of FIGS. 2A-2C in flow chart form.

Turning now to FIG. 6, an embodiment of a process for operating the apparatus 10 of FIGS. 2A-2C is illustrated in flow chart form. At the start, a box enters the apparatus from another conveyor system, for example (Block 202), and the conveyor of the apparatus moves the box into the cutting zone (Block 204). The controller actuates the rails to position and hold the box in a cutting position on the conveyor (Block 206). The controller then measures the output from the sensors of the apparatus to determine the dimensions of the box (Block 208). Based on the measurements, the controller calculates the motion vectors required to position the cutting head to cut the box according to the programmed cut pattern for the box in the cutting position (Block 210). Then, the controller actuates the robot to cut the box according to the calculated motion vectors (Block 212). Once the cut is complete, the controller actuates the rails to release the box (Block 214), and the conveyor is actuated to move the box out of the cutting zone of the apparatus (Block 216).

With an understanding of the process 200 performed by the apparatus discussed above, reference is now made to FIGS. 7A-7B, 8A-8B, 9A-9B, 10A-10B, and 11A-11B, which illustrate schematic views of the disclosed apparatus 10 during various stages of operation to detect, position, measure and cut a box. In each pair of these schematic views, FIGS. 7A, 8A, 9A, 10A, and 11A show a schematic plan view of components of the apparatus 10, while FIGS. 7B, 8B, 9B, 10B, and 11B show a schematic side view of components of the apparatus 10. Not all components of the apparatus 10 are shown in these figures to facilitate discussion.

Figure 7A:
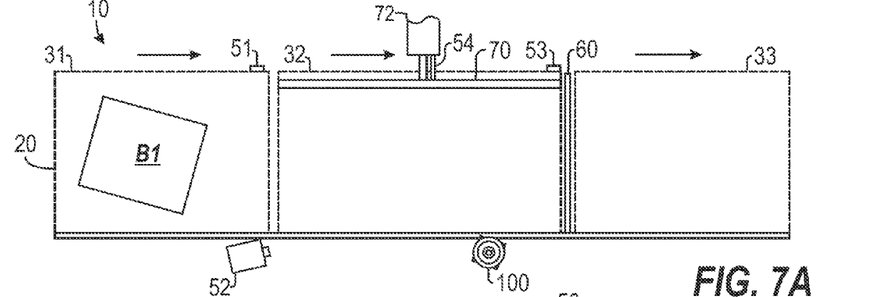
FIGS. 7A-7B, 8A-8B, 9A-9B, 10A-10B, and 11A-11B illustrate schematic views of the automated box opening apparatus during various stages of operation.
Figure 7B:
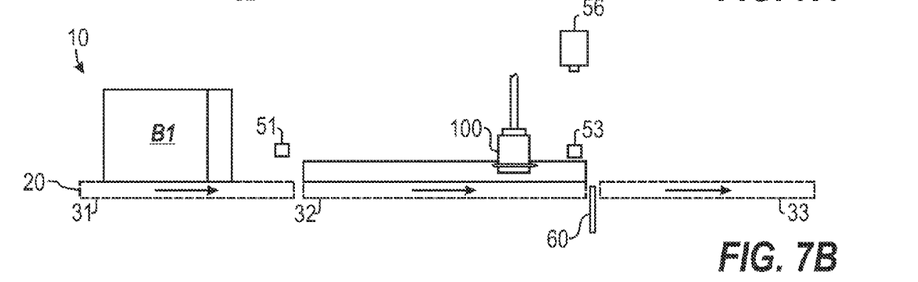

As shown in FIGS. 7A-7B, the conveyor system 20 has three zones 31, 32, and 33 that can be independently operated to move boxes through the apparatus 10 during operation. The first zone 31 delivers unprocessed boxes to the second, intermediate zone 32, where the boxes are cut using the cutting head 100. After being cut, the intermediate zone 32 moves the processed box to the third zone 33 that moves the box out of the apparatus 10.

As shown, a first box B1 has been fed into the apparatus 10 by another conveyor or other method. All zones 31, 32, and 33 of the conveyor 20 are operating (as depicted by the arrows), and the first zone 31 delivers the first box B1 toward the intermediate zone 32. The first box B1 can be oriented in any general position while traveling on the conveyor 20. As it is moved along the first zone 31, the first photo eye sensor 51 detects when the first box B1 is moved from the first zone 31 to the intermediate zone 32.

Figure 8A:
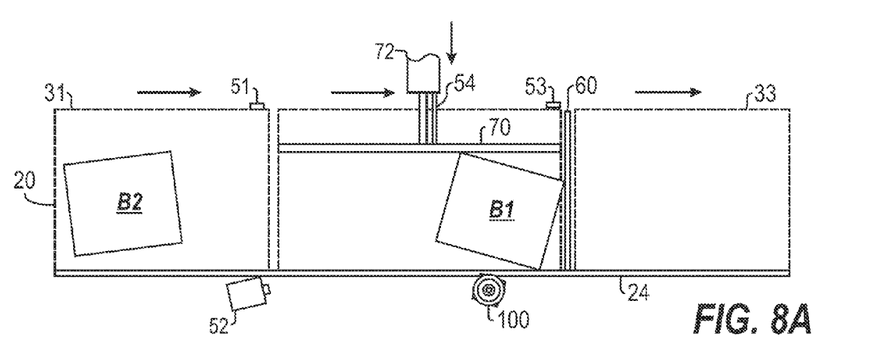
Figure 8B:
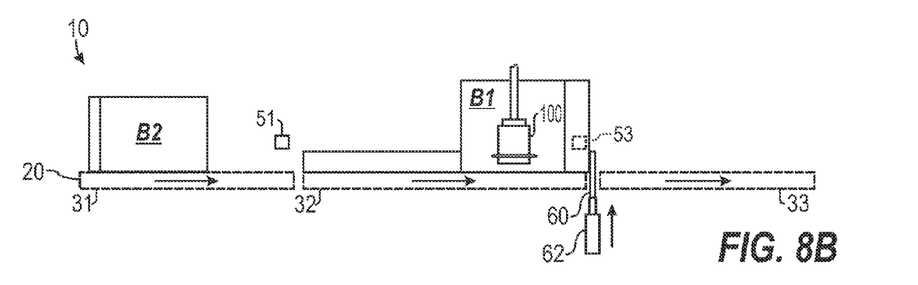

In FIGS. 8A-8B, the stopping rail 60 is shown actuated by its actuator 62 so that a portion of the rail 60 extends above the plane of the conveyor 20. The first box B1 has been moved by the intermediate conveyor zone 32 to engage the raised stopping rail 60. The second photo eye 53 detects the first box B1 in this fully advanced position engaging the stopping rail 60. As a result, the positioning rail 70 is actuated by its actuator 72 to move the first box B1 against the inside rail 24 of the conveyor system 20 and substantially align the sides of the box B1 with the rails 24, 60, and 70. While the positioning rail 70 pushes the first box B1, the intermediate conveyor zone 32 preferably remains activated to ensure that the front side of the box B1 stays engaged against the stopping rail 60. As also shown in FIGS. 8A-8B, a second box B2 may be delivered at this point into the apparatus 10 to the first conveyor zone 31.

Figure 9A:
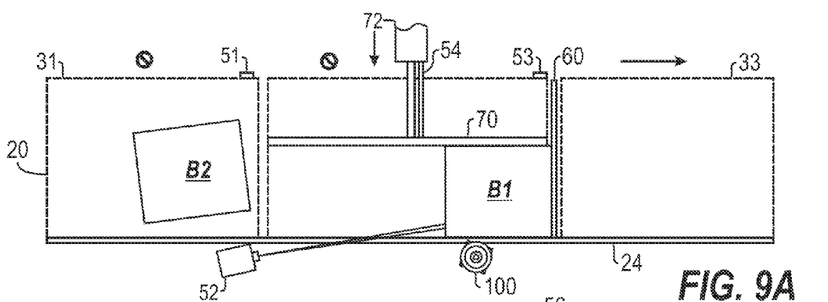
Figure 9B:
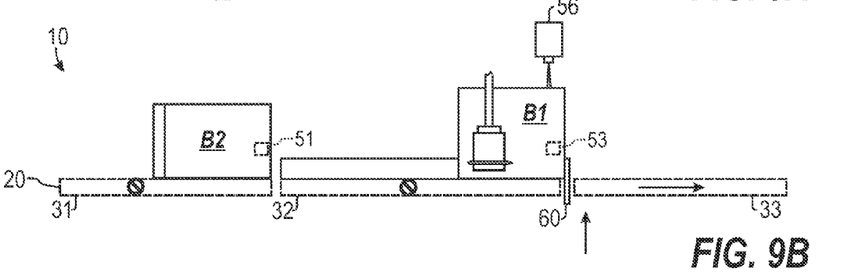

In FIGS. 9A-9B, the intermediate conveyor zone 32 has been stopped, and the first box B1 is held by rails 24, 60, and 70. The linear displacement transducer 54 of the positioning rail 70 is used to determine a first dimension (e.g., width) of the first box B1. As shown in FIG. 9A, the first laser sensor 52 is used to determine a second dimension (e.g., length) of the box B1. As shown in FIG. 9B, the second laser sensor 56 is used to determine a third dimension (e.g., height) of the box B1. The first conveyor zone 31 is stopped when the first photo eye 51 detects the second box B2.

Based on a comparison of the three measured dimensions, the controller (not shown) of the apparatus 10 can determine how these dimensions correspond to the height, the width, and the length of the box B1 as applicable to the programmed cut pattern to be made on the box B1. In addition, the controller (not shown) can determine which cut pattern to use on the box based on the three dimensions.

Figure 10A:
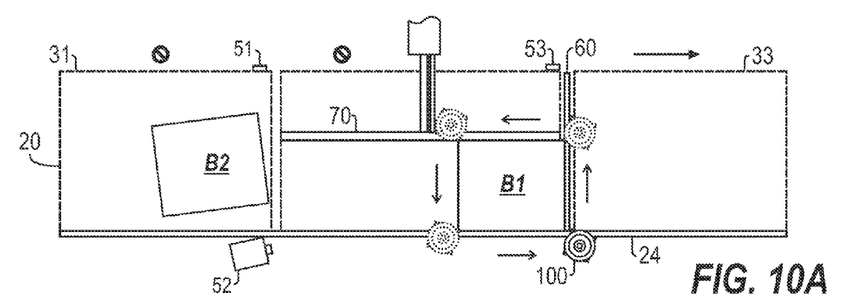
Figure 10B:
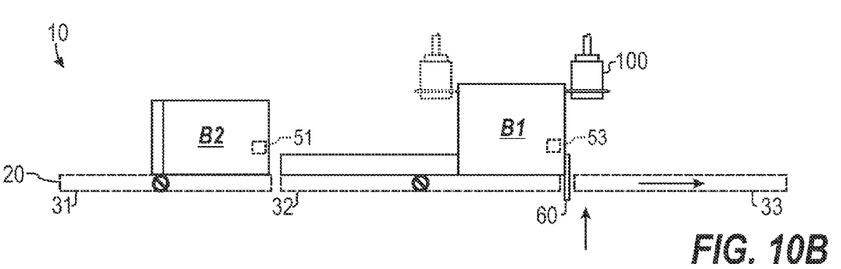

In FIGS. 10A-10B, the cutting head 100 is moved by the robot (not shown) to a beginning position, which in the present example is a small distance from the top of the box B1. The robot (not shown) then moves the cutting head 100 about the sides of the box B1 to perform the programmed cut pattern of cuts, scores, or perforations on one or more sides of the box B1.

The rails 60 and 70 help to square and hold the box B1, putting the box surfaces in a more predictable location. If a low cut on the box B1 is not required, the heights of the positioning and stopping rails 60 and 70 can be increased to provide additional stability and squaring of the box, especially for taller boxes. The side of the cutting head 100 tends to push the box sides to their average position just before cutting as the head 100 traverses across the box surfaces. The cut path can be programmed to be slightly inside of the box walls (1 to 8-mm) to compensate for possible indentions or concavities in the sides. In some situations where a box is damaged, the cut may be interrupted due to grossly indented areas, which will require the top to be manually removed (i.e., a user must tear away a chad).

Figure 11A:
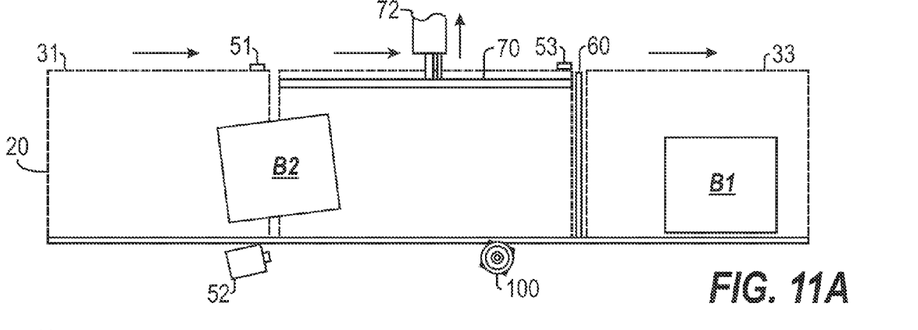
Figure 11B:
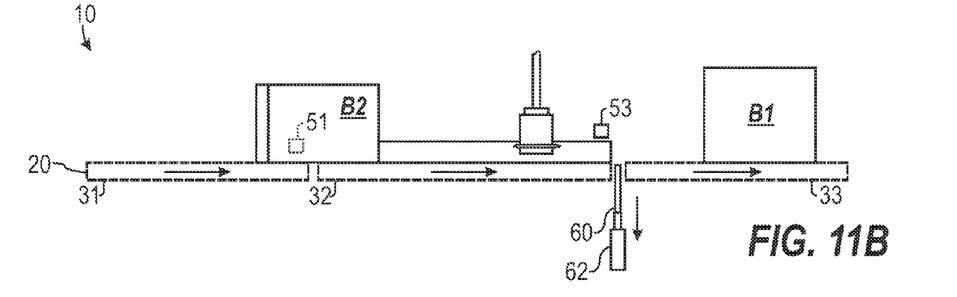

In FIGS. 11A-11B, the robot (not shown) moves the cutting head 100 to a resting position when the cutting operation is completed. The stopping rail 60 is lowered by its actuator 62, and the positioning rail 70 is retracted by its actuator 72. The intermediate conveyor zone 32 is activated, and the processed box B1 is moved onto the third conveyor zone 33 to remove the first box B1 from the apparatus 10. Once the second photo eye 53 detects the first box B1 as leaving the intermediate zone 33, the stopping rail 60 is again raised, and the first conveyor zone 31 is activated to move the second box B2 forward. The operation of the apparatus 10 then repeats itself. The second box B2 can also be arbitrarily oriented as it enters the intermediate conveyor zone 32. In addition, the second box B2 can have the same or different dimensions than the first box B1. Furthermore, the second box B2 can be programmed for the same or different type or style of cut pattern than the first box B1.

Figure 12:
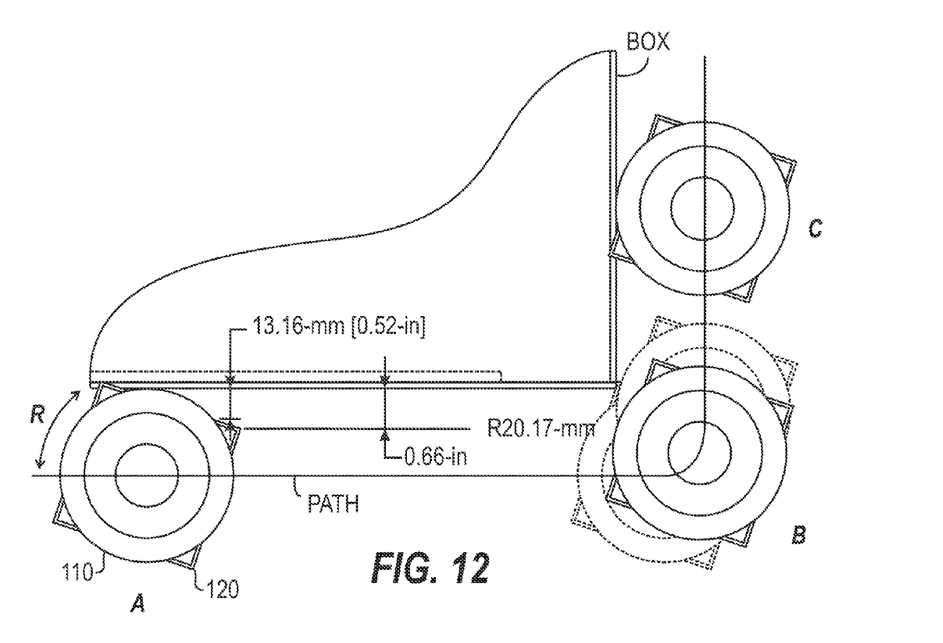
FIG. 12 illustrates a plan view of a route of a cutting head and blade in cutting open a box according to certain teachings of the present disclosure.

Referring to FIG. 12, a plan view of a route of the cutting head 110 of FIG. 3 is illustrated for cutting a box. As discussed previously, the cutting head 110 preferably has blade 120 of FIG. 4, which has four cutting edges and eight cutting surfaces. The box is typically made of corrugated cardboard or similar material. Rather than rotating, the blade 120 of the cutting head 110 preferably slices or slits cuts or perforations into the material of the box to reduce the possibility of dust or fragments being produced. In alternative embodiments, the cutting head 110 can rotate or spin so that the blade 120 spins about an axis as it cuts along the sides of the box.

In embodiments of a head having less than four blades, such as the one blade head 150 of FIG. 5, then the one blade head must be stopped and briefly paused at corners of the box so that the head can be rotated to position the single blade for cutting the next side of the box. Pausing the head and rotating it to position the single blade requires that the head be decelerated during the cut, which may not be desirable. However, the four-edged blade 120 shown in FIG. 12 allows the robot to move the head 100 in an efficient path when cutting around corners of the box.

The four-edged blade 120 of the present embodiment does not require the head 110 to be rotated at each corner of the box. Instead, the robot moves the head 110 along a substantially straight path from point A to point B as one edge of the blade 120 slices the side of the box. At the corner of the box, the robot moves the head 110 to round the corner, and the next edge of the blade 120 is already in position to cut the next side of the box without the need to rotate the cutting head 110. The robot then moves the head 110 along a substantially straight path from point B to point C as this second edge of the blade 120 slices the adjacent side of the box. This can be repeated for all sides of the box. Because the path of the cutting head 100 is rounded at the corner of the box, the robot can maintain an almost constant speed as it moves around the box. This can decrease the time it takes for the apparatus to cut a box.

As noted previously, the four-edged blade 120 preferably has eight cutting surfaces. Four of the cutting surfaces can be used when the head 110 is moved in one direction around the box, and the other four can be used when the head 110 is moved in the reverse direction. Alternatively, the blade 120 can be flipped in the head 110. These steps can be used to increase the life of the blade. The controller (not shown) disclosed herein can automatically detect the wear on the blade 120 by sensing an increase in drag caused by dulling of the cutting surfaces as the blade 120 cuts. For example, the controller can track the total linear distance that a particular blade has been used to cut. The controller can then compare the tracked distance to a predetermined distance related to the estimated life of the blade to determine when to change the blade 120. In addition, the controller can monitor a cutting force as the blade 120 is used, and the controller can thereby determine whether to change the blade 120 when that force exceeds a predetermined threshold.

To make a sustained cut or score in the material of the box, the head 110 runs substantially parallel to the side of the box as the blade 120 cuts. To make perforations or interrupted cuts in the material, the head 110 can be repeatedly rotated as it moves parallel to the side so that the blade 120 makes periodic cuts along the side of the box. The blade 120 can be designed to cut regular slotted carton (RSC) boxes having corrugated cardboard, hot melt glue seals, tape, and other conventional materials associated with cartons or boxes.

The depth of the cut produced with the blade 120 can be altered by changing the angle of orientation or rotation R of the head 110 relative to the side of the box. Rotating the cutting head 110 corresponds to rotating an axis of the robot's shaft (not shown). Slight changes in the angle of rotation R of the cutting head 110 set the cutting depth. The rotation R can be maintained during cuts to achieve an equal depth as the blade cuts a side of the box. The same rotation R can be maintained while the blade cuts the other sides of the box so that the cutting head does not need to be rotated when making the same cut with the same depth on more than one side of the box.

As desired, the rotation R of the head 110 can be repeatedly modulated while traveling along its path to produce perforations or interrupted cuts in the box. Although modulating the blade 120 depth for interrupted cuts or varying the cut depth can be achieved with embodiment so of the cutting head having a single blade, the present embodiment of the cutting head 110 does not require calculating a cut depth index relative to each ninety-degree index for the sides of the box. In addition, rotation of the robot's shaft may be limited so that rotating about the angle of rotation R may also be limited and the single-blade head will typically need to be "unraveled" before it can cut another box.

In some applications, boxes conveyed into the apparatus 10 may have dents or indentations in the sides of the boxes. Because the depth of the cuts produced with the apparatus 10 is programmable and controllable, operation of the apparatus does not necessarily depend on the sides of the box being "perfectly" located. The penetration of the cuts into the sidewalls of the boxes is limited by the "hilt" or side of the head 110. The box wall is contacted by the head 110 as the cut begins conforming to the box surface. If the box surface is sharply indented, the blade 120 may skip cutting that indented area.

In one embodiment of the box cutting apparatus, a camera (not shown) can be mounted in a position adjacent the laser sensor 56 shown in FIGS. 2A-2C. The camera can have a view angle looking downward at a box and can obtain a profile of the sides of the box. From the profile, the controller 40 can use recognition software to develop a path for the cutting head 100 that can accommodate possible dents or bulges in the box. According to this technique, the robot 80 can move the cutting head 100 along a path that would attempt to cut all of the surfaces of the box even if they include dents or bulges. As a similar alternative, the box cutting apparatus 10 can include additional laser sensors (not shown) to scan the perimeter of the box and determine the box's side profile to develop a cutting path.

Figure 13:
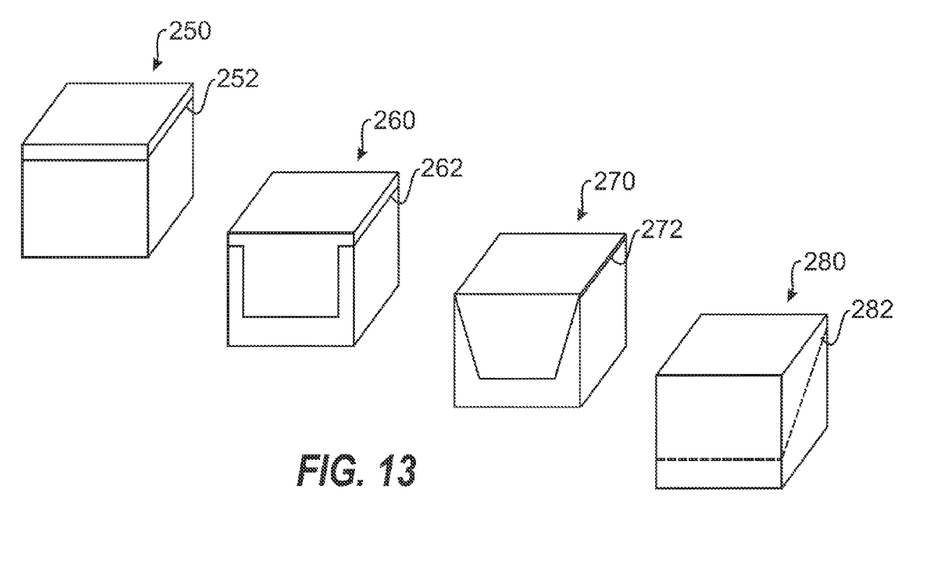
FIG. 13 illustrates embodiments of cuts for boxes that can be performed by the automated box opening apparatus.

As disclosed above, the automated box opening apparatus is designed to perforate, cut, or slit a box. The cut pattern is programmable. For example, a user can program the apparatus 10 to remove major and minor flaps of a box, cut three sides, or cut away a front wall to create a display case. These cut patterns can then be transformed to fit the measured dimensions of the boxes entering the apparatus. Referring to FIG. 13, some embodiments of cut patterns for boxes are illustrated. In a first type, box 250 has a cut pattern 252 formed near the top edge of the box 250. The cut pattern 252 can be a cut or score made around all sides of the box 250 to remove the top. When the apparatus performs such a cut pattern 252 on all four sides, it may be desirable to leave at least a portion of the top connected to the remainder of the box. For example, the cutting element may intentionally not cut one or more corner edges of the box or may leave one or more tabs interconnecting the top with the rest of the box. In this way, the top portion does not fall off during operation of the apparatus. A user can then readily remove the top portion from the remainder of the box when the box has exited the apparatus. Alternatively, the cut pattern 252 can be a cut or score can be made along three sides to make a top flap on the box 250.

In other types, boxes 260, 270, and 280 show cut patterns 262, 272, and 282 for making the boxes into display cases having partially open sides or panels for removing objects from the boxes. These cut patterns 262, 272, and 282 includes cuts that are angled relative to the sides of the boxes 260, 270, and 280. To produce such angled cuts, the programmable motion device (80) can be capable of angling a blade of the cutting element (100) and translating the cutting element (100) simultaneously in two axes. To angle the blade, the programmable motion device (80) is preferably capable of rotating about one or more axes substantially orthogonal to the sidewalls of the box.

Alternatively, the cutting element (100) may include a pre-angled blade (e.g., a blade already oriented at 45-degrees in the head of the cutting element), and the programmable motion device (80) translates the angled blade of the cutting element (100) simultaneously in two axes. Moreover, the cutting head 150 of FIGS. 5A-5B having one or more pivotable blades 160 can be used to produce angled cuts. Thus, as the head 150 is moved in an angular direction relative to a side of the box, the pivotable blade 160 being used to cut the side of the box can pivot in compliance with its angular direction of movement.

Box 280 is also shown with its cut pattern 282 being perforated so that portion of the box 280 can be removed later. The perforated cut pattern, such as the one shown on box 280, can be useful for retailers. Currently, retailers use die cut boxes that already have perforated or pre-scored cuts formed in them for making the boxes into displays. As mentioned previously, the automated box opening apparatus of the present disclosure is capable of programmable cut patterns that can be perforated, scored, or have a few tabs left to hold portions or panels of the box in place. By processing the boxes in this way, stockers in retail stores can "punch out" the perforations or remove panels to make the boxes into displays. In addition, the ability to perforate or prepare a box for later opening can be useful for distribution centers for retailers. For example, the distribution center can use an automated box opening apparatus of the present disclosure to prepare the boxes when pulling orders for the retail stores. When the precut boxes arrive at the retail stores, stockers can open the prepared boxes without using box cutters or other tools.

Figure 14:
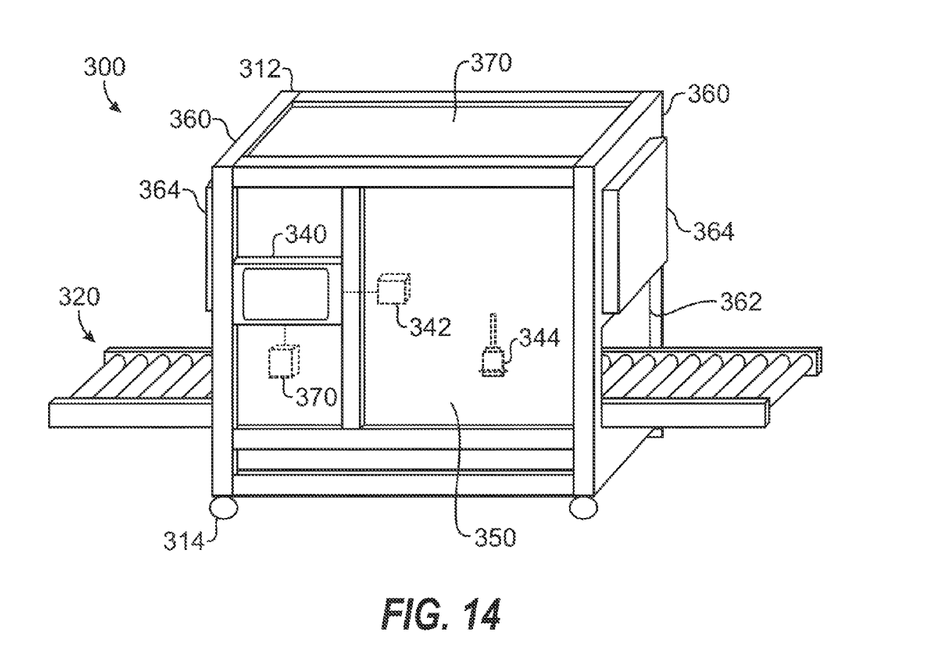
FIG. 14 illustrates another embodiment of an automated box opening apparatus having a reinforced enclosure and a detector with sniffer technology.

In addition to being used for co-pack or other related operations, the disclosed apparatus 10 can be used in mail rooms of large corporate centers or government facilities to automatically open post and shipping parcels using the techniques disclosed herein. In this context, the apparatus can include components for inspecting the parcels for explosives or biological agents. For example, FIG. 14 illustrates an embodiment of an automated box opening apparatus 300 having a reinforced enclosure 312 and a device 342 for detecting explosives and/or biological agents. The detector 342 uses "sniffer" technologies to detect explosives or biological agents in boxes or parcels processed by the apparatus 300. The detector 342 is coupled to the controller 340, which controls and monitors the detector 342. A suitable device for a detector 342 of explosives is Fido™explosives detector by Nomadics or Sionex's patented microDMx™ sensor system. A suitable device for a detector 342 of biological agents is a RAMP Biodetection System by Response Biomedical Corporation or GeneXpert by Cepheid Corporation. The apparatus 300 can use one or more of these sniffer detectors 342 for a given implementation.

Although the detector 342 can be used as the parcel or box enters the apparatus 300 in order to detect any trace material outside a box, the apparatus 300 preferably uses the detector 342 while the box is being opened. When opening a box, for example, the apparatus 300 can use the detector 342 to draw air samples from inside of the box as the head 344 performs a cut of the box. By drawing the sample from inside the box, the disclosed apparatus can potentially produce higher detection accuracy than simply trying to detect traces from outside the box.

When used in detecting biological agents, the enclosure 312 is preferably sealable having sealable doors 364 for the entrance and exits 362 of the conveyor system 320. The sealable enclosure 312 is intended to contain a potential contaminant. When used in detecting explosives, the enclosure 312 can have reinforced sidewalls 350 and ends 360 as well as a bottom (not shown). The top 370 of the enclosure 312 can be designed to blow off during an explosion to direct pressures upward and not outward. In addition, the enclosure 312 can have closable doors 364 for the entrance and exits 362 of the conveyor system 320. The reinforced enclosure 312 is intended to contain a potential explosion.

If the detector 342 detects a threat in the form of an explosive or biological agent, the controller 340 closes and seals the doors 364 at the entrance and exit 362 of the conveyor system 320. Preferably, the apparatus 300 has casters 314 or rollers and is moveable. Once the threat has been detected and the apparatus 300 sealed or closed, the apparatus 300 can be disengaged from other components, such as adjacent conveyors so that the entire apparatus 300 with a potentially harmful box inside can be moved out of a building.

In yet another embodiment, the automated box opening apparatus 300 can be coupled to an imaging system 370, such as an X-ray scanner or other device known in the art, to image the contents of the boxes. The imaging system 370 can be used for security purposes. In addition, the imaging system 370 can provide information about the contents of the boxes and the location of the contents in the boxes. The controller 340 can then perform image processing of the image information from the system 370 and can derive a cutting pattern or profile for the cutting head 344 that takes the location of the box's contents into consideration.

The foregoing description of preferred and other embodiments is not intended to limit or restrict the scope or applicability of the inventive concepts conceived of by the Applicants. For example, various embodiments of automated box opening apparatus having different features and components have been described. It will be appreciated that these different features and components can be combined in various combinations. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A box processing apparatus, comprising:
   a conveyor;
   a programmable motion device adjacent the conveyor for moving a cutting element in at least three orthogonal axes;
   at least one first sensor adjacent the conveyor for determining three orthogonal dimensions of a box;
   a memory for storing a plurality of cut definitions, each cut definition defining one or more box cuts; and
   a controller operably coupled to the conveyor, the programmable motion device, the at least one first sensor, and the memory, the controller being programmable to:
   operate the conveyor to move a box to a position relative to the programmable motion device,
   select one of the cut definitions in memory,
   create a path for moving the cutting element relative to the box based on the determined dimensions of the box and the selected cut definition, and
   operate the programmable motion device to move the cutting element relative to the box according to the path to produce the one or more box cuts of the selected cut definition in the box with the cutting element.

2. The apparatus of claim 1, wherein the conveyor comprises at least two zones being separately operable, a first of the at least two zones adjacent the programmable motion device, a second of the at least two zones conveying the box to the first zone.

3. The apparatus of claim 1, wherein the conveyor comprises a plurality of actuatable rollers controlled by the controller.

4. The apparatus of claim 1, wherein the programmable motion device comprises a robotic arm, the cutting element coupled to the robotic arm and being translatable by the robotic arm in the at least three orthogonal axes.

5. The apparatus of claim 4, wherein the cutting element is rotatable by the robotic arm about at least one of the three orthogonal axes.

6. The apparatus of claim 5, wherein adjustment of rotation of the cutting element about the at least one axis is capable of adjusting a cutting depth producible with the cutting element in the side of the box as the cutting element is translated along the side of the box.

7. The apparatus of claim 5, wherein repeated reciprocating rotation of the cutting element about the at least one axis while the cutting element is translated in a direction along the side of the box is capable of producing a perforated cut in the side of the box with the cutting element.

8. The apparatus of claim 1, further comprising a first rail being substantially orthogonal to a direction of the conveyor and being selectively operable by the controller to stop the box in the position on the conveyor relative to the programmable motion device.

9. The apparatus of claim 8, wherein the first rail comprises a first actuator controlled by the controller to move at least a portion of the first rail above and below a plane defined by the conveyor.

10. The apparatus of claim 8, further comprising a second rail positioned substantially parallel to the conveyor, the second rail being selectively operable by the controller to engage the box on the conveyor.

11. The apparatus of claim 10, wherein the second rail comprises a second actuator controlled by the controller to position a side of the box against a third rail being fixed and substantially parallel to the second rail.

12. The apparatus of claim 1, wherein the at least one first sensor comprises a linear displacement transducer coupled to the controller to determine one of the three orthogonal dimensions of the box.

13. The apparatus of claim 1, wherein the at least one first sensor comprises a scanner for reading a code or detecting a radio frequency tag of the box, the code or tag associated with the three orthogonal dimensions and the cut definition for the box.

14. The apparatus of claim 1, wherein the at least one first sensor comprises a camera obtaining an image of at least a portion of the box, and wherein the controller is operable to determine the three orthogonal dimensions of the box from the obtained image.

15. The apparatus of claim 1, further comprising at least one second sensor operably coupled to the controller to detect a presence of a biological or explosive agent associated with the box.

16. The apparatus of claim 1, wherein the box cuts of the cut definitions comprise one or more cuts, slits, scores, or perforations to be performed in one or more sides of the box and being parallel or angled relative to the sides of the box.

17. The apparatus of claim 1, wherein the cutting element comprises at least one blade having at least one cutting surface.

18. The apparatus of claim 17, wherein the at least one blade is oriented at a substantially orthogonal angle to an axis of the cutting element, oriented at a non-orthogonal angle relative to the axis, or is pivotable relative to the axis.

19. The apparatus of claim 1, wherein the cutting element comprises:
a blade being substantially symmetrical and having a plurality of cutting surfaces;
a first portion attachable to the programmable motion device; and
a second portion attachable to the first portion to hold the blade therebetween.

20. The apparatus of claim 19, wherein:
a first of the cutting surfaces produces a first cut in a first side of a box when the programmable motion device translates the cutting element in a first direction, and
a second of the cutting surfaces produces a second cut in a second side of the box when the programmable motion device translates the cutting element in a second direction without rotating the cutting element relative to the box.

21. The apparatus of claim 19, wherein the cutting element is rotatable about a central axis by the programmable motion device, and wherein a rotated orientation of the cutting element relative to a side of the box determines a depth of the blade in the side of the box while the programmable motion device translates the cutting element in a direction substantially parallel to the side.

22. The apparatus of claim 1, wherein the cutting element comprises:
a body coupleable to the programmable motion device;
a pivot mechanism attached to the body; and
a blade attached to the pivot mechanism,
wherein the blade is adapted to pivot on the pivot mechanism substantially in a direction the body is moved during cutting.

23. The apparatus of claim 1, wherein the at least one first sensor comprises a laser sensor coupled to the controller to determine one of the three orthogonal dimensions of the box.

24. The apparatus of claim 1, wherein the at least one first sensor comprises three sensors directed substantially orthogonal to one another for determining the three orthogonal dimensions of the box.

25. The apparatus of claim 1, wherein the controller is programmable to select one of the plurality of cut definitions based on the determined dimensions of the box or an identifier obtained from the box with a scanner operatively coupled to the controller.

26. The apparatus of claim 1, wherein the apparatus handles boxes of arbitrary size and orientation when fed therein.

27. A box processing apparatus, comprising:
means for moving each box to a stationary position in the apparatus;
means for moving at least one cutting blade in at least three orthogonal axes relative to sides of each box;
means for determining three orthogonal dimensions of each box in the apparatus;
means for selecting one of a plurality of cut definitions for each box;
means for creating paths for moving the at least one cutting blade relative to each box based on the determined dimensions and the selected cut definitions for each box; and means for programmably cutting each box in the stationary position with the at least one cutting blade moved according to the created path for each box.

28. The apparatus of claim 27, wherein the means for moving each box to the stationary position in the apparatus comprises means for conveying each box with at least two separately operable zones.

29. The apparatus of claim 27, wherein the means for moving each box to the stationary position in the apparatus comprises means for selectively stopping and holding each box in the stationary position.

30. The apparatus of claim 27, wherein the means for moving the at least one cutting blade in at least three orthogonal axes relative to sides of each box comprise means for translating the at least one cutting blade in at least three substantially orthogonal axes.

31. The apparatus of claim 30, wherein the means for moving the at least one cutting blade relative to sides of each box comprise means for rotating the at least one cutting blade about at least one of the substantially orthogonal axes.

32. The apparatus of claim 30, wherein the means for rotating the at least one cutting blade about at least one of the substantially orthogonal axes comprises means for producing a perforated cut in the boxes with the at least one cutting blade.

33. The apparatus of claim 27, further comprising means for detecting presence of a biological or explosive agent associated with the box.

34. The apparatus of claim 27, further comprising means for determining location of contents in the box.

35. The apparatus of claim 27, wherein the means for selecting one of a plurality of cut definitions for each box comprises means for selecting the cut definitions for each box based on the determined dimensions of each box or based on an identifier obtained from each box.

36. The apparatus of claim 27, wherein the apparatus handles boxes of arbitrary size and orientation when fed therein.

37. An item processing apparatus, comprising:
a conveyor for moving an item;
a programmable motion device adjacent the conveyor for moving an articulatable element in at least three orthogonal axes relative to the item;
at least one first sensor adjacent the conveyor for determining one or more dimensions of the item on the conveyor;
a memory for storing a preset definition defining one or more spatial movements;
a controller operably coupled to the conveyor, the programmable motion device, the at least one first sensor, and the memory, the controller being programmable to:
operate the conveyor to move the item to a position relative to the programmable motion device,
create a path for moving the articulatable element relative to the item based on the determined dimensions of the item and the preset definition,
operate the programmable motion device to move the articulatable element according to the path relative to the item to achieve the one or more spatial movements of the preset definition; and
at least one second sensor operably coupled to the controller, the at least one second sensor detecting a presence of a biological or explosive agent associated with the item in response to the movement of the articulatable element relative to the item.

38. The apparatus of claim 37, wherein the programmable motion device comprises a robotic arm, the articulatable element coupled to the robotic arm and being translatable by the robotic arm in the at least three orthogonal axes.

39. The apparatus of claim 38, wherein the articulatable element is rotatable by the robotic arm about at least one of the at least three orthogonal axes.

40. The apparatus of claim 37, wherein the articulatable element comprises at least one blade having at least one cutting surface.

41. The apparatus of claim 37, wherein the at least one first sensor comprises a linear displacement transducer coupled to the controller to determine one of the dimensions of the item.

42. The apparatus of claim 37, wherein the at least one first sensor comprises a laser sensor coupled to the controller to determine one of the dimensions of the item.

43. The apparatus of claim 37, wherein the at least one second sensor comprises a sniffer detector obtaining a sample of outside the box and detecting for trace material from the sample.

44. The apparatus of claim 37, wherein the at least one second sensor comprises a sniffer detector obtaining a sample of inside the box and detecting for trace material from the sample.

45. The apparatus of claim 37, wherein the memory stores a plurality of the preset definitions, each defining one or more spatial movements, and wherein the controller is programmable to select one of the preset definitions.

* * * * *

UNITED STATES PATENT AND TRADEMARK OFFICE
CERTIFICATE OF CORRECTION

| | | |
|---|---|---|
| PATENT NO. | : 7,720,567 B2 | Page 1 of 1 |
| APPLICATION NO. | : 11/164909 | |
| DATED | : May 18, 2010 | |
| INVENTOR(S) | : Doke et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this
Eleventh Day of January, 2011

David J. Kappos
*Director of the United States Patent and Trademark Office*